(12) United States Patent
Nishikawa et al.

(10) Patent No.: US 8,209,210 B2
(45) Date of Patent: Jun. 26, 2012

(54) SYSTEM AND METHOD FOR CALCULATING AND DISPLAYING ESTIMATED WAIT TIMES FOR TRANSACTION REQUEST BASED ON THE SKILL REQUIRED TO PROCESS THE TRANSACTION REQUEST

(75) Inventors: Akira Nishikawa, Tokyo-to (JP);
Masato Yokote, Kanagawa-ken (JP);
Tsutomu Moriya, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 12/026,803

(22) Filed: Feb. 6, 2008

(65) Prior Publication Data
US 2008/0300956 A1    Dec. 4, 2008

Related U.S. Application Data

(62) Division of application No. 10/106,567, filed on Mar. 26, 2002, now Pat. No. 7,373,309.

(30) Foreign Application Priority Data

Mar. 30, 2001    (JP) ................................. 2001-098458

(51) Int. Cl.
*G06Q 10/00* (2012.01)
(52) U.S. Cl. ....................................................... 705/7.14
(58) Field of Classification Search .................. 705/7.14
See application file for complete search history.

(56) References Cited

U.S. PATENT DOCUMENTS

| | | | |
|---|---|---|---|
| 4,757,529 A | 7/1988 | Glapa et al. | |
| 4,788,715 A | 11/1988 | Lee | |
| 5,006,983 A | 4/1991 | Wayne et al. | |
| 5,020,095 A | 5/1991 | Morganstein et al. | |
| 5,206,903 A | 4/1993 | Kohler et al. | |
| 5,278,898 A * | 1/1994 | Cambray et al. | 379/266.1 |
| 5,291,550 A | 3/1994 | Levy et al. | |
| 5,444,774 A * | 8/1995 | Friedes | 379/266.01 |
| 5,506,898 A | 4/1996 | Constantini et al. | |
| 5,544,232 A * | 8/1996 | Baker et al. | 379/88.25 |
| 5,592,542 A * | 1/1997 | Honda et al. | 379/266.05 |

(Continued)

FOREIGN PATENT DOCUMENTS

EP    1087596 A2    3/2001

(Continued)

OTHER PUBLICATIONS

CentreVu Advocate, Release 9, User Guide Avaya Communication, Dec. 2000.*

(Continued)

*Primary Examiner* — Scott L Jarrett
(74) *Attorney, Agent, or Firm* — Scully, Scott, Murphy & Presser, P.C.; Ronald A. Kaschak

(57) ABSTRACT

A reception management system for handling transactions includes a plurality of ACMs (Automated Contract/Consulting Terminals) for receiving procedure requests for predetermined transactions from customers, a plurality of ROTs (Remote Operation Terminals) to be employed by an operator for handling the procedure requests, a server for storing information for managing the operators for each transaction skill, and information about queues formed for each transaction skill upon a procedure request accepted from an ACM, and a queue monitoring terminal for monitoring the queues by receiving information from the SACD server.

3 Claims, 12 Drawing Sheets

U.S. PATENT DOCUMENTS

| | | | |
|---|---|---|---|
| 5,684,872 | A | 11/1997 | Flockhart et al. |
| 5,721,770 | A | 2/1998 | Kohler |
| 5,742,675 | A * | 4/1998 | Kilander et al. ......... 379/266.09 |
| 5,825,869 | A * | 10/1998 | Brooks et al. ............ 379/265.12 |
| 5,857,018 | A * | 1/1999 | Sumner et al. ........... 379/265.13 |
| 5,864,616 | A | 1/1999 | Hartmeier |
| 5,867,572 | A | 2/1999 | MacDonald et al. |
| 5,894,512 | A * | 4/1999 | Zenner ..................... 379/265.02 |
| 5,903,641 | A | 5/1999 | Tonisson |
| 5,905,793 | A | 5/1999 | Flockhart et al. |
| 5,915,011 | A | 6/1999 | Miloslavsky |
| 5,926,539 | A | 7/1999 | Shtivelman |
| 5,946,388 | A | 8/1999 | Walker et al. |
| 5,982,873 | A | 11/1999 | Flockhart et al. |
| 5,991,392 | A | 11/1999 | Miloslavsky |
| 6,023,681 | A * | 2/2000 | Whitt ............................... 705/8 |
| 6,044,146 | A * | 3/2000 | Gisby et al. .............. 379/266.02 |
| 6,046,762 | A * | 4/2000 | Sonesh et al. ............. 348/14.11 |
| 6,064,730 | A | 5/2000 | Ginsberg |
| 6,067,457 | A | 5/2000 | Erickson et al. |
| 6,130,942 | A | 10/2000 | Stenlund |
| 6,134,318 | A | 10/2000 | O'Neil |
| 6,157,655 | A * | 12/2000 | Shtivelman ................... 370/412 |
| 6,163,607 | A | 12/2000 | Bogar et al. |
| 6,173,053 | B1 | 1/2001 | Bogart et al. |
| 6,173,209 | B1 | 1/2001 | Laval et al. |
| 6,192,122 | B1 | 2/2001 | Flockhart et al. |
| 6,222,920 | B1 | 4/2001 | Walker et al. |
| 6,226,377 | B1 | 5/2001 | Donaghue, Jr. |
| 6,295,551 | B1 | 9/2001 | Roberts et al. |
| 6,301,703 | B1 * | 10/2001 | Shank et al. .................. 717/109 |
| 6,314,177 | B1 | 11/2001 | Davis et al. |
| 6,347,139 | B1 * | 2/2002 | Fisher et al. ............. 379/265.12 |
| 6,349,290 | B1 * | 2/2002 | Horowitz et al. ............... 705/35 |
| 6,389,028 | B1 * | 5/2002 | Bondarenko et al. ......... 370/401 |
| 6,404,747 | B1 * | 6/2002 | Berry et al. ................... 370/270 |
| 6,408,277 | B1 | 6/2002 | Nelken |
| 6,434,230 | B1 | 8/2002 | Gabriel |
| 6,518,994 | B1 * | 2/2003 | Johnson et al. ............ 348/14.11 |
| 6,535,601 | B1 * | 3/2003 | Flockhart et al. ........ 379/266.01 |
| 6,553,114 | B1 | 4/2003 | Fisher et al. |
| 6,563,788 | B1 | 5/2003 | Torba et al. |
| 6,570,963 | B1 * | 5/2003 | Watson et al. .................. 379/52 |
| 6,587,556 | B1 | 7/2003 | Judkins et al. |
| 6,661,889 | B1 | 12/2003 | Flockhart et al. |
| 6,665,390 | B1 | 12/2003 | Ekstrom |
| 6,665,395 | B1 | 12/2003 | Busey et al. |
| 6,665,396 | B1 | 12/2003 | Khouri et al. |
| 6,694,009 | B1 | 2/2004 | Anderson et al. |
| 6,714,643 | B1 * | 3/2004 | Gargeya et al. .......... 379/266.06 |
| 6,720,967 | B1 * | 4/2004 | Cox et al. ...................... 345/440 |
| 6,724,885 | B1 | 4/2004 | Deutsch et al. |
| 6,728,363 | B2 | 4/2004 | Lieberman et al. |
| 6,823,054 | B1 * | 11/2004 | Suhm et al. ................... 379/134 |
| 6,832,203 | B1 | 12/2004 | Villena et al. |
| 6,859,529 | B2 | 2/2005 | Duncan et al. |
| 6,870,926 | B2 | 3/2005 | Shambaugh et al. |
| 6,882,641 | B1 | 4/2005 | Gallick et al. |
| 6,898,190 | B2 | 5/2005 | Shtivelman et al. |
| 6,925,165 | B2 | 8/2005 | Cohen et al. |
| 6,934,381 | B1 | 8/2005 | Klein et al. |
| 6,952,732 | B2 | 10/2005 | Nourbakhsh et al. |
| 6,959,078 | B1 | 10/2005 | Eilbacher et al. |
| 6,970,552 | B1 * | 11/2005 | Hahn et al. ............... 379/265.02 |
| 6,970,829 | B1 * | 11/2005 | Leamon ...................... 705/7.14 |
| 6,972,761 | B1 | 12/2005 | Cox et al. |
| 6,978,247 | B1 | 12/2005 | Bogart et al. |
| 7,035,808 | B1 | 4/2006 | Ford |
| 7,050,567 | B1 | 5/2006 | Jensen |
| 7,068,775 | B1 | 6/2006 | Lee |
| 7,200,219 | B1 * | 4/2007 | Edwards et al. ......... 379/265.01 |
| 7,224,791 | B2 | 5/2007 | Haukilahti |
| 7,274,787 | B1 | 9/2007 | Schoeneberger |
| 7,602,899 | B1 | 10/2009 | Thenthiruperai |
| 7,607,130 | B2 * | 10/2009 | Singh et al. ................... 718/100 |
| 2002/0123983 | A1 | 9/2002 | Riley et al. |

FOREIGN PATENT DOCUMENTS

| | | |
|---|---|---|
| JP | 2000-11074 | 1/2000 |
| WO | WO 99/65214 | 12/1999 |
| WO | WO 00/35173 | 6/2000 |
| WO | WO 02/096079 | * 11/2002 |

OTHER PUBLICATIONS

"Call Center Elevates Customers Beyond Next in Queue", Communications News, vol. 32, No. 11, Nov. 1995.

Hui, Michael, et al., "What to Tell Customers in Waits of Different Lengths: An Integrative Model of Service Evaluation", Journal of Marketing, vol. 60, No. 2, Apr. 1996.

Morrow, Marissa, "Cost-Justifying Call Center Investments", Telemarketing & Call Center Solutions, vol. 16, No. 4, Oct. 1997.

Mandelbaum, Avi, et al., "Estimating Characteristics of Queueing Networks Using Transactional Data Technion", Jan. 21, 1997.

Anderson, Janie, "Prediction: Cutting-Edge Routing Will Lead to Inbound Efficiency", Call Center Solutions, Aug. 1999.

Whitt, Ward, "Improving Service by Informing Customers About Anticipated Delays", Management Science, vol. 45, No. 2, Feb. 1999.

Whitt, Ward, "Predicting Queueing Delays", Management Science, vol. 45, No. 6, Jun. 1999.

Durrande-Moreau, Agnes, "Waiting for Service: Tean Years of Empirical Research", International Journal of Service Industry Management, vol. 10, No. 2, 1999.

Patel, Susmit H., Performance Inference Engine (PIE)—Deducing More Performance Using Less Data Passive & Active Workshop, Apr. 3, 2000.

CallPath Call Coordinator CICS for OS/390—General Information, Version 2, Release 1, IBM, GC34-5394-01 Jun. 2000.

Office Action dated Apr. 11, 2011 received in a related U.S. Patent Application, namely U.S. Appl. No. 12/026,980.

U.S. Office Action for U.S. Appl. No. 12/026,980 dated Mar. 8, 2010.

U.S. Office Action for U.S. Appl. No. 12/026,980 dated Jul. 29, 2010.

U.S. Office Action for U.S. Appl. No. 12/026,980 dated Dec. 29, 2010.

* cited by examiner

FIG. 4A

| OOO Bank | | | ROT management | |
|---|---|---|---|---|
| ⌐61 | ⌐62 | ⌐63 | ⌐64 | ⌐65 |
| ROT-ID | Terminal Name | Host Named | Fault Information | Telephone Number |
| 39-001 | Kasumigaseki 003 | KASUMI | Nothing | 00-3333-1111 |
| | | | | |
| | | | | |
| | | | | |
| | | | | |

[Return]        [Add] [Change] [Delete]

FIG. 4B

| OOO Bank | | | ACM management | |
|---|---|---|---|---|
| ⌐66 | ⌐67 | ⌐68 | ⌐69 | ⌐70 |
| ACM-ID | Terminal Name | Branch Number | Host Named | Telephone Number |
| A001 | Shibuya I | 833 | SHIBU | 03-100-1000 |
| | | | | |
| | | | | |

[Return]        [Add] [Change] [Delete]

FIG. 5A

| Operator ID | Operator Name | Division | Transaction Group Name |
|---|---|---|---|
| SB21001 | Tokkyo Hanako | S3 | Notices |
| SB21002 | Hatsumei Yoshimi | J1 | Home loan |
| | | | |
| | | | |
| | | | |

○○○ Bank — Operator Management

71 Operator ID  72 Operator Name  73 Division  74 Transaction Group Name

[Return]   [Add]  [Change]  [Delete]

FIG. 5B

○○○ Bank — Operator Management - Add (Change)

71 — Operator ID: SB21002

72 — Operator Name: Hatsumei Yoshimi

73 — Division: J1

75 — Password: ****

Password (confirmed): ****

74 — Transaction Group Name

| ID | Memo | Selection |
|---|---|---|
| | Home loan | ☐ |
| | Deposit | ☐ |

[Cancel]  [OK]

FIG. 7

○○○ Bank

Receiving Waiting Operator List

Transaction Group Name [ 90 ]

| Operator ID | Operator Name | Division | Transaction Group ID | Transaction Group Name | Last Reception Date |
|---|---|---|---|---|---|
| SB21002 | Hatsumei Yoshimi | O | J1 | Home loan | 2001/04/01 10:00 |
| SB21001 | Tokkyo Hanako | O | S3 | Notices | 2001/04/01 10:20 |
| SB21005 | Kenri Yuko | O | J1 | Home loan | 2001/04/01 12:21 |
| SB20016 | Kinyu Megumi | O | J1, S3 | Home loan Notices | 2001/04/01 14:08 |

Return

SYSTEM AND METHOD FOR CALCULATING AND DISPLAYING ESTIMATED WAIT TIMES FOR TRANSACTION REQUEST BASED ON THE SKILL REQUIRED TO PROCESS THE TRANSACTION REQUEST

CROSS REFERENCE TO RELATED APPLICATION:

The present application is a divisional application of U.S. patent application Ser. No. 10/106,567, filed Mar. 26, 2002.

FIELD OF THE INVENTION

The present invention relates to a reception management system having a customer terminal typically placed at a business office or branch of a financial institution, and an operator terminal typically placed at a business center of the financial institution, and more particularly to a reception management system for creating a queue for each transaction upon a request from the customer.

BACKGROUND

In financial institutions such as banks, ATMs (Automated Teller Machines) installed at unattended stations such as a cash service floor or a convenience store may be vigorously employed to make transactions with customers. However, various kinds of procedures for loans, such as home loans, or various kinds of notices, such as address change notices, cannot be processed at the ATM or unattended station, and such transactions are instead performed between a customer and a bank clerk at a branch window of the bank, for example.

To provide services not offered by an ATM or unattended station in an unattended environment, a system having an ACM (Automated Contract/Consulting Machine) as a core has been proposed. This system allows transactions to be made, including a transaction of opening a composite ordinary account and issuing a bankbook rapidly, and a transaction of automatically accepting an application for a card loan or a credit card at a remote site. For example, a bi-directional video conference system is provided to enable the bank clerk (operator) at the remote site to deal with a question or a consultation, whereby the transaction process that conventionally could not be performed except by the direct reception can be made in the unattended environment.

In the system environment having an ACM (Automated Contract/Consulting Machine) as a core, a screen/data sharing technique between two remote sites employing Java, for example, has been employed. With these techniques, a customer who operates the ACM (Automated Contract/Consulting Machine) and the bank clerk can perform the process, while watching the screen in the same progress. Therefore, the customer can be given appropriate advice by the bank clerk if the customer is confused with the operation, or needs to refer to a selection screen for the commodity.

Upon a connection request for each transaction from the ACM (Automated Contract/Consulting Machine) settled at a business office or branch, for example, a ROT (Remote Operation Terminal) placed at a business center of the financial institution is connected. Generally, the number of ROTs (Remote Operation Terminals) is smaller than the number of ACMs (Automated Contract/Consulting Machines), and it is difficult to allocate all the requests from the ACMs (Automated Contract/Consulting Machines) to the ROTs (Remote Operation Terminals) at the same time.

Conventionally, only a message such as "Not connectable due to congestion at present" was returned to the ACM (Automated Contract/Consulting Machine), and a connection request with the ACM (Automated Contract/Consulting Machine) from the customer was simply refused. As a result, the financial institution lost a transaction with potential profit, causing a significant loss of opportunity.

At the conventional business office or branch counter, the customer stands in a line with a number ticket, and is called from the window in turn to make a transaction with the bank clerk. At this time, there is no problem if the transaction is done with a single item of business, but if there is any entry error or lack of a necessary document, of if it is necessary to fill in another form, or if a transaction is accepted only at another window, the customer must stand at the end of the line with a number ticket again. Even when the ACM (Automated Contract/Consulting Machine) is employed, in the above-mentioned cases, the customer is required to line up again at the end of a queue, resulting in a very long waiting time. Also, when the ACM (Automated Contract/Consulting Machine) is connected to the operator in charge of another transaction due to an operation error of the customer, it is necessary to newly connect to the operator in charge of correct transaction. In this case, the waiting time is longer, like lining up at the end of a queue, which is an unfavorable state for the customer.

SUMMARY

The present invention has been conceived to solve the aforementioned technical problems. It is an object of the invention to optimize a waiting time of the customer in assigning the operator operating an operator terminal upon a reception request from a customer terminal.

It is another object of the invention to estimate reception waiting time more accurate by taking into consideration the time for which one transaction is completed in accordance with the degree of expertness in the transaction skills of the operator.

It is a further object of the invention to reduce a loss of opportunity by suppressing the refusal for a connection request from the customer.

It is a still another object of the invention to make it possible to change the priority level of the customer in a queue.

To attain the above objects, the present invention includes a scheme for allocating the ROT (Remote Operation Terminal) as an operation terminal installed at a business center to the ACM (Automated Contract/Consulting Machine) as a customer terminal placed at a business office or branch of the financial institution upon a connection request for each transaction from the ACM (Automated Contract/Consulting Machine), in which a queue for each transaction such as a loan or an investment trust is provided to efficiently allocate the customer to the person in charge of acceptance (operator). According to an aspect of the invention, a management system for handling transactions comprises a plurality of customer terminals for receiving a request for a predetermined transaction from a customer, a plurality of operator terminals for handling the request from the customer terminal by an operator, and a computer system (server), in response to the request from the customer terminal, for assigning an operator terminal that can handle the requested transaction, wherein the computer system (server) has a database for storing transaction management information including, for each operator terminal the transaction type that can be handled by the operator and reception waiting information including the status of the operator terminal, together with data items on transactions that can be handled.

The management system for handling transactions further comprises calculating means for calculating a waiting time of the customer for each transaction based on the transaction management information and the reception waiting information that are stored in the database, wherein the operator terminal displays the waiting time calculated by the calculating means and an estimated waiting time that is updated with the elapse of time. Preferably, the waiting time can be indicated to the customer and displayed at relatively high accuracy.

Also, the management system for handling transactions further comprises queue creating means for creating a queue in a transaction unit, based on the transaction management information and the reception waiting information that are stored in the database. Therefore, the waiting time can be optimized to relieve a customer's sense of "being kept waiting".

According to another aspect of the invention, a management system for handling transactions comprises a plurality of contract/consulting machines (e.g. ACMs) for accepting a procedure request for a predetermined transaction from a customer, a plurality of consulting operation terminals (e.g. ROTs) for handling the procedure request from the customer at the contract/consulting machine (e.g. ACMs) by an operator, and a queue monitoring device for managing the operator waiting for or receiving the customer at the consulting operation terminal (e.g. ROTs) on a transaction skill basis, and monitoring a queue of the contract/consulting machine to be formed on the transaction skill in response to the procedure request accepted from the contract/consulting machine.

The queue monitoring device displays a list of contract/consulting machines (e.g. ACMs) waiting to be assigned with a priority level, and therefore is favorable in that the present assignment waiting condition is easier to grasp.

Also, the queue monitoring device allows the queue to be changed by changing the priority level in the list of contract/consulting machines (e.g. ACMs) to be displayed, and therefore is favorable in that the waiting time of predetermined customer can be shortened by the judgement of the supervisor.

According to another aspect of the invention, there is provided a terminal comprising: request accepting means for accepting a reception request for a predetermined transaction from the customer; output means for outputting the reception request accepted by the request accepting means, including the information of the predetermined transaction, to a server; receiving means for receiving, from the server, an estimated waiting time for the reception request output from the output means, the estimated waiting time being determined from a reception status of one or more persons in charge having transaction skills; and display means for displaying the estimated waiting time received from the receiving means.

The terminal may further comprise customer identification means for identifying the customer making the reception request, whereby if the identified customer is an excellent customer, an operator with higher specialty can be allocated, so that the satisfaction of the customer is enhanced.

The receiving means receives the estimated waiting time being determined based on the information of the identified customer, whereby the estimated waiting time can be newly displayed on the basis of changed priority level.

According to another aspect of the invention, there is provided a terminal for handling a transaction for a customer by an operator, the operator terminal being connectable to a plurality of client devices at which the customer makes a reception request, comprising: communication means for communicating with a server providing the information regarding the allocation of the client devices, and accepting means for accepting a log-on request from the operator who has been registered as the person having a predetermined transaction skill, wherein the communication means transmits the log-on request accepted by the accepting means, including the information of the operator, to the server, and receives a reception instruction for transactions that can be handled by the operator from the server.

A preferred form of a management server according to this invention is as follows. The management server comprises: request receiving means for receiving a connection request from a customer terminal, the request receiving means being connected to a plurality of terminals requesting execution of a predetermined transaction; status receiving means for receiving information that an operator having a predetermined transaction skill can handle the transaction at an operator terminal, the status receiving means being connected to a plurality of operator terminals that are operated by the operators; queue setting means for setting a queue for the customer terminal sending the connection request for each transaction; and allocation means for allocating the operator terminal operated by the operator to the customer terminal in the queue for each transaction, based on the transaction skill of the operator for handling each transaction that is provided by the status receiving means.

The queue is managed in a state where the customer terminals have a priority level appended, and the management server may further comprise transmitting means for transmitting data on the number of waiting consumers determined from the queue to the customer terminal.

Also, the management server may further comprise waiting time setting means for setting an estimated waiting time for each transaction based on the queue provided by the queue setting unit and waiting time data transmitting means for transmitting the estimated waiting time data set by the waiting time setting means to the customer terminal sending the connection request. This waiting time setting means may correspond to a database used to calculate the waiting time passed to the management server.

According to another aspect of the invention, there is provided a device comprising receiving means for receiving queue information of customer terminals requesting a reception with an operator and waiting for connection with the operator, from a database; display means for displaying the queue information received by the receiving means, including the information of transaction type and a priority for each transaction type; priority changing means for changing the priority displayed on the display means; and transmitting means for transmitting the information of priority changed by the priority changing means to the database.

The display means displays a warning on a queue monitoring terminal of any customer terminal that still resides in the queue after the elapse of a predetermined time, and therefore is favorable in that the customer with a long waiting time is more noticeable. The warning may be displayed in a color (e.g., yellow) or flashed.

According to another aspect of the invention, there is provided a method of assigning an operator terminal, comprising the steps of receiving a connection request from a customer terminal that requests execution of a predetermined transaction requiring an operator's response, receiving a log-on process of the operator terminal that can handle the customer's request, assigning to the requesting customer terminal, the operator terminal of the operator that can handle the requested transaction based on previously inputted information on operator's transaction skills, and adding the customer terminal to a queue created for each transaction if any operator with the transaction skills that can handle the requested transaction cannot be found.

The method may further comprise the steps of calculating an estimated waiting time for the customer terminal added to the queue and notifying customer terminal of the calculated estimated waiting time. Thereby, it is possible to minimize the customer's complaint of "being kept waiting" and reduce the risk of losing opportunity on the operation side.

Also, the method may further comprise the steps of managing the customer terminal added to the queue in due order for each transaction, and accepting change of the order to be managed. Thereby, there is no need for a customer making an operation error to stand at the end of a line again by raising the order of the customer.

According to another aspect of the invention, there is provided a storage medium storing program code to be executed by a computer. This program code enables the computer to perform the steps of receiving a connection request from a customer terminal that requests execution of a predetermined transaction requiring an operator's response, assigning to the requesting customer terminal, an operator terminal of the operator that can handle the requested transaction based on the previously inputted information on operators' transaction skills and adding the customer terminal to a queue created for each transaction if an operator with the transaction skills to handle the requested transaction cannot be found. This storage medium is suitably a CD-ROM, for example. The program may be read by a CD-ROM reading device for the computer on the server side in a client server system, and stored in a hard disk drive for the computer.

Preferred embodiments of the present invention will be described below in detail with reference to the accompanying drawings.

BRIEF DESCRIPTION OF THE DRAWINGS

FIGS. 4A and 4B are diagrams showing display examples of a management screen for the ACM (Automated Contract/Consulting Machine) and the ROT (Remote Operation Terminal), respectively;

FIGS. 5A and 5B are diagrams showing examples of display screens for person-in-charge management;

FIG. 7 is a diagram showing a display screen for a list of persons in charge waiting for reception;

DETAILED DESCRIPTION

Figure 1:
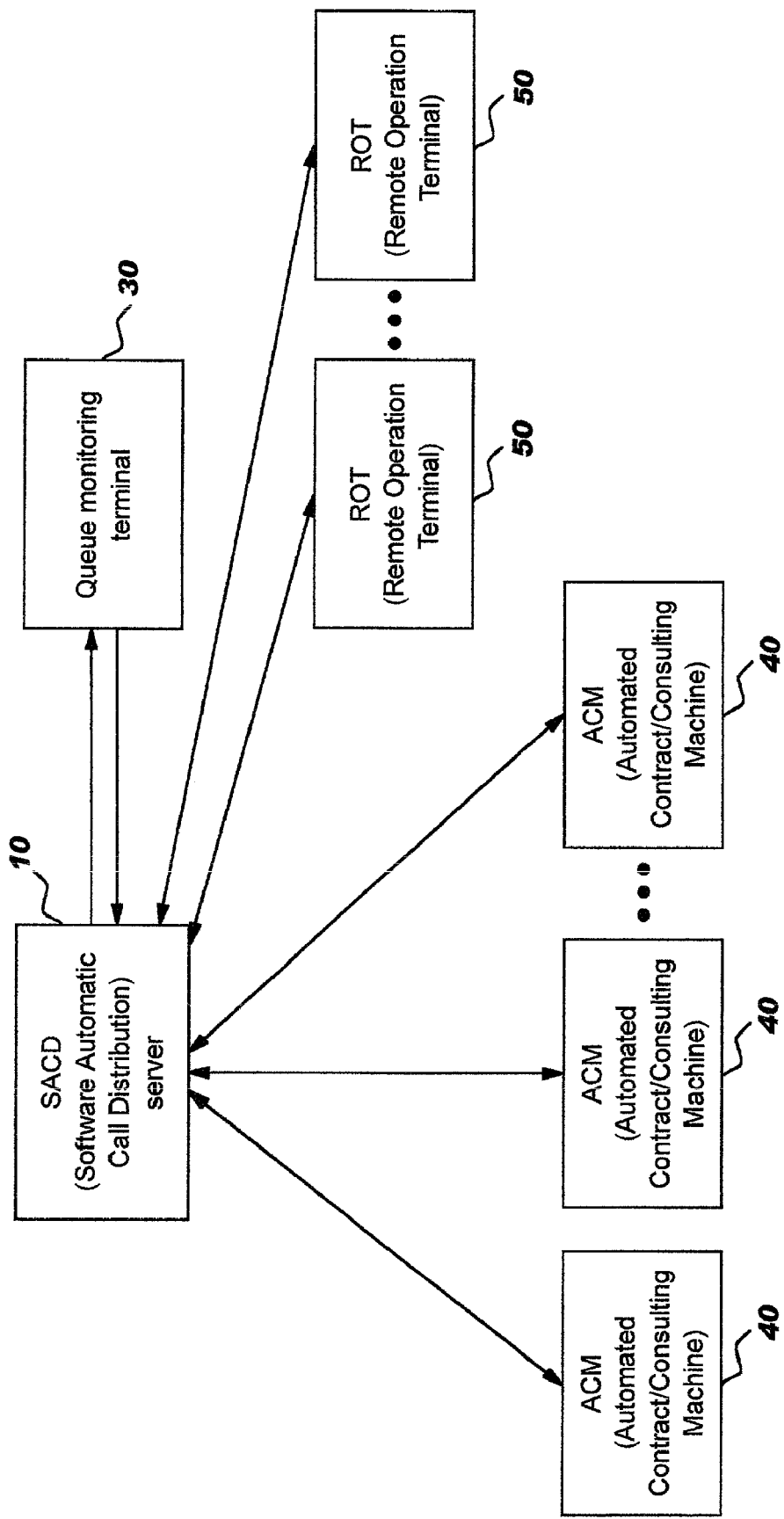
FIG. 1 is a block diagram showing an overall configuration of a system according to an embodiment of the invention.

FIG. 1 is a block diagram showing an overall configuration of a system according to an embodiment of the invention. This system has a server and a client, and comprises an SACD (Software Automatic Call Distribution) server 10 as the center of the financial institution, and a queue monitoring terminal 30 for managing the system as the client. As another client, the system comprises a plurality of ACMs (Automated Contract/Consulting Machines) 40 that are customer terminals and a plurality of ROTs (Remote Operation Terminals) 50 that are operator terminals on the center side. The ACM (Automated Contract/Consulting Machine) 40 is installed at a plurality of business offices or branches which the financial institution possesses, and operated by customers who desire to make various kinds of enquiries or contracts. The ROT (Remote Operation Terminal) 50 is installed mainly in a business center of the financial institution, and operated by the operator (person in charge) with the skills for handling the transactions such as a loan and an investment trust. These servers and clients may be connected via private lines provided for the financial institution, for example.

The SACD server 10 operates under an operating system (OS) such as AIX (UNIX for IBM Corporation) or UNIX, and allocates the ROT (Remote Operation Terminal) 50 while communicating with the queue monitoring terminal 30. Also, the SACD server 10 has a database (DB) that is maintained and operated by the Data Base Management System (DBMS). By making access to this database, the waiting situation can be displayed at each terminal. The queue monitoring terminal 30 provides the environment for effecting various operations to optimize a waiting time of the customer. For example, the queue monitoring terminal 30 determines a reception condition of the ROT (Remote Operation Terminal) 50, a status of availability of the operator, and a service condition of the ACM (Automated Contract/Consulting Machine) 40, and from these can change the priority level in the queue. In changing this priority, when the customer is waiting for a certain time period or more, e.g., 40 to 50 minutes, at the ACM (Automated Contract/Consulting Machine) 40, the queue monitoring terminal 30 displays a warning, and notifies the supervisor to take a predetermined action, or to raise the priority by manual operation or under automatic control. For example, even if the ROT (Remote Operation Terminal) 50 is connected to the operator in charge of another transaction due to an operation error of the customer, the transaction is accepted preferentially without need of lining up again. The queue monitoring terminal 30 is not necessarily provided separately from the SACD server 10, but its function may be provided inside the SACD server 10.

Figure 2:
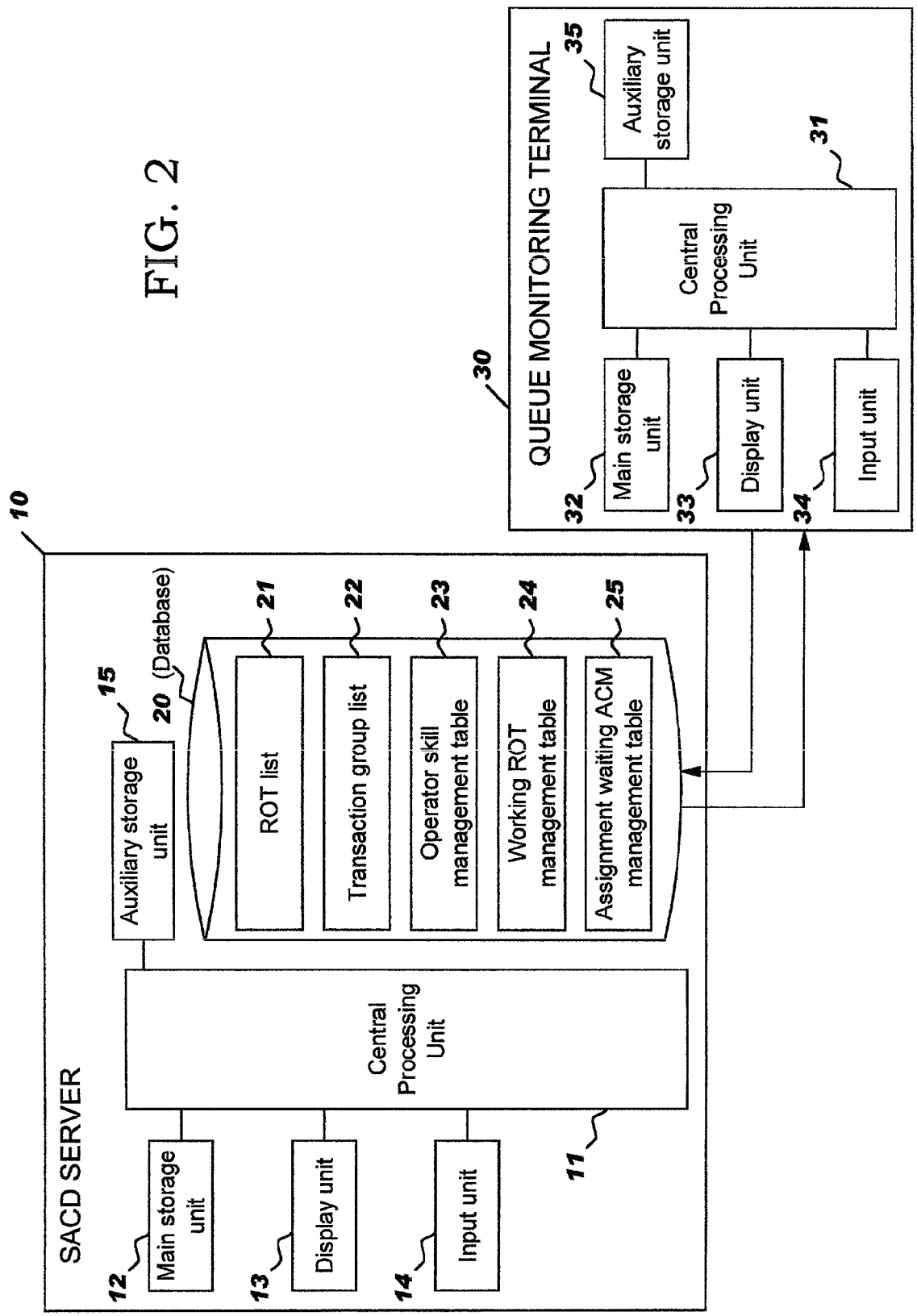
FIG. 2 is a block diagram showing a configuration of an SACD server and a queue monitoring terminal.

FIG. 2 is a block diagram showing a configuration of the SACD server 10 and the queue monitoring terminal 30. The SACD server 10 comprises a central processing unit 11 that is a CPU for controlling the SACD server 10, a main storage unit 12 which may include a RAM that is a working memory for the central processing unit 11, a display unit 13 for displaying various sorts of information, an input unit 14 which may include a mouse and a keyboard, and an auxiliary storage unit 15 such as a hard disk drive (HDD), for example. This auxiliary storage unit 15 comprises a database 20 that stores the resource information or connection information for the ACM (Automated Contract/Consulting Machine) 40 or the ROT (Remote Operation Terminal) 50. This database 20 stores an ROT list 21, a transaction group list 22, a person-in-charge skill management table 23, a working ROT management table 24, and an assignment waiting ACM management table 25.

The ROT list 21 in the database 20 contains a table of information regarding plural ROTs (Remote Operation Terminals) 50, including the log-on or log-off state. The transaction group list 22 contains information regarding the transaction group allocated to the person in charge (operator) with the predetermined skills, according to a transaction ID and a transaction name. The person-in-charge skill management table 23 contains a list of transactions that can be handled by the person in charge for each transaction group. The working ROT management table 24 contains the identification information of person in charge, and the data of one or more transactions that can be handled, as well as the situation data of the person in charge who is waiting for reception or engaged in reception. Also, the assignment waiting ACM management table 25 contains the terminal name, the contents of requested transactions, the waiting times, and the priorities. A queue is substantially made up of the data of the working ROT management table 24 and the assignment ACM management table 25, whereby a request from the customer is controlled in this queue for each transaction.

Firstly, the SACD server 10 has a DB management function for managing the database 20 by connecting to the DBMS set up on the same host. Further, the SACD server 10 has an ACM management function for notifying assignment, estimated waiting time and a number of persons waiting for the ROT (Remote Operation Terminal) 50 by accepting a connection request from the ACM (Automated Contract/Consulting Machine) 40, an ROT management function for accepting a request for log-on or log-off from the person in charge of the registered ROT (Remote Operation Terminal) 50, or notifying the assignment from the ACM (Automated Contract/Consulting Machine) 40, and a supervisor terminal management function for accepting the log-on or log-off of the queue monitoring terminal 30 or a state management request. Furthermore, the SACD server 10 has a log management function for managing the logging as a whole and a reconnection function to be made after the recovery from the fault to effect a fault recovery processing.

The queue monitoring terminal 30 comprises a central processing unit 31 that is a CPU for controlling the queue monitoring terminal 30, a main storage unit 32 that is a working memory of the central processing unit 31, a display unit 33 for displaying the availability condition of the operator, and a service condition or a waiting condition of the ACM (Automated Contract/Consulting Machine) 40, an input unit 34 for inputting a change in the waiting condition, like changing the priority in the queue by the supervisor, and an auxiliary storage unit 35 that includes of an HDD, for example. The information required for displaying the waiting condition is passed from the SACD server 10 to the queue monitoring terminal 30 via the database 20. Also, the information regarding the change of the queue that is made by the operator who operates the queue monitoring terminal 30 is passed from the queue monitoring terminal 30 to the SACD server 10.

The queue monitoring terminal 30 has a log-on/log-off function for making a log-on or log-off under the administration of the supervisor. Also, the queue monitoring terminal 30 has a resource management function for enabling management (create, delete, change and display of list) by the person in charge, transaction group, the information of the ACM (Automated Contract/Consulting Machine) 40, and the information of the ROT (Remote Operation Terminal) 50. Also, the queue monitoring terminal 30 has a queue monitoring function for monitoring the connection status of the ROT (Remote Operation Terminal) 50 that is logged on and a list of ACMs (Automated Contract/Consulting Machines) 40 waiting to be assigned. Further, the queue monitoring terminal 30 has a connection support function for changing the priority of assignment for the ACM (Automated Contract/Consulting Machine) 40 waiting to be assigned to the ROT (Remote Operation Terminal) 50.

Figure 3:
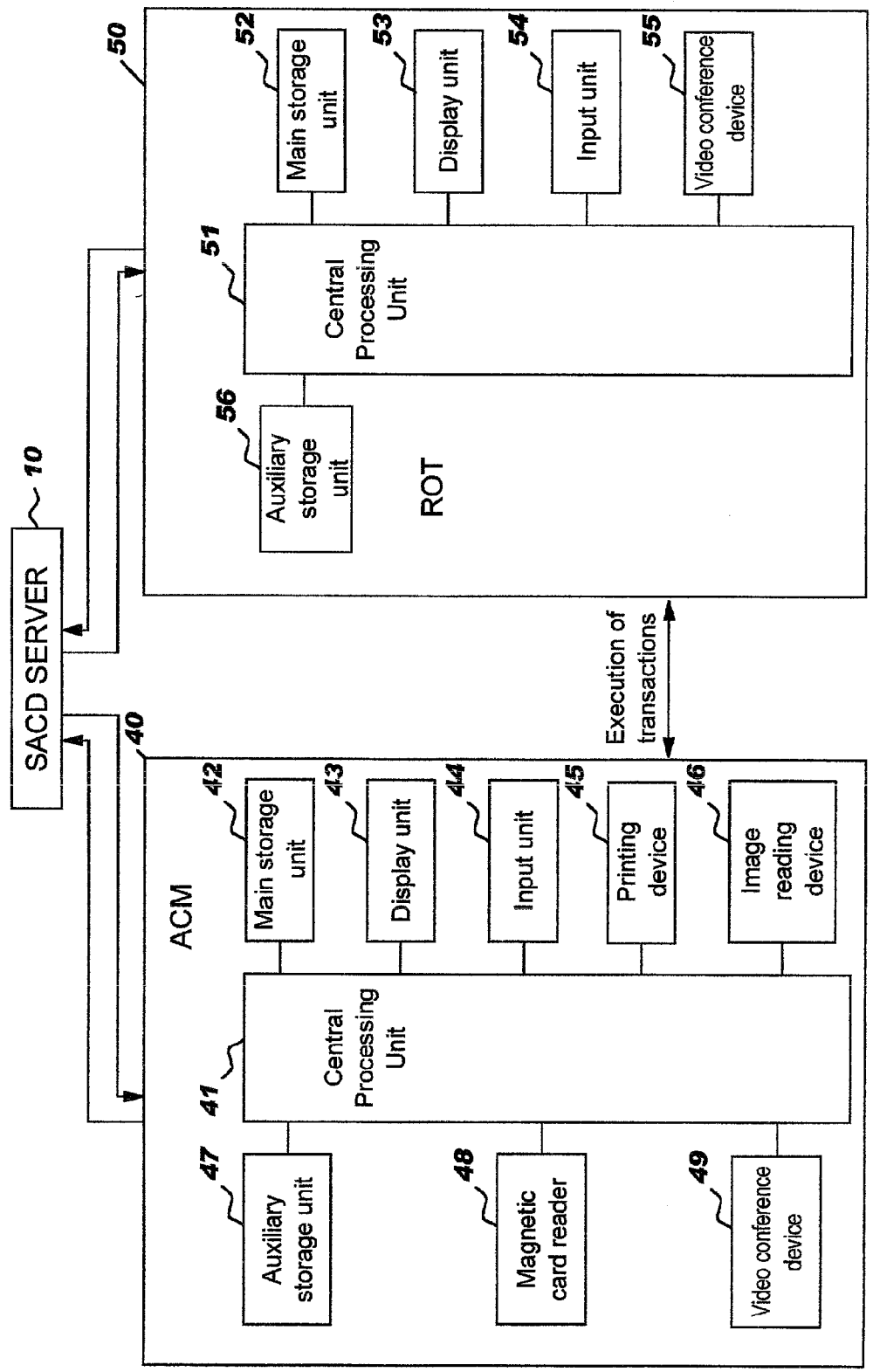
FIG. 3 is a block diagram showing a configuration example of an ACM (Automated Contract/Consulting Machine) and an ROT (Remote Operation Terminal)

FIG. 3 is a block diagram showing a configuration example of the ACM (Automated Contract/Consulting Machine) 40 and the ROT (Remote Operation Terminal) 50. The ACM (Automated Contract/Consulting Machine) 40 comprises a central processing unit 41 for controlling the ACM (Automated Contract/Consulting Machine) 40, a main storage unit 42 that is a working memory of the central processing unit 41, a display unit 43 for displaying various sorts of menu regarding the contract or consulting, an input unit 44 (including a touch panel) for enabling the customer to input various sorts of information based on the menu displayed on the display unit 43, a printing device 45 that is a printer for printing out the contract, application or notice, and an image reading device 46 that is a scanner for scanning the contract or application filled out by the customer. Also, the ACM (Automated Contract/Consulting Machine) 40 comprises an auxiliary storage unit 47 composed of an HDD, a medium reading device 48 for reading an identification medium such as a money card for the customer, and a video conference system device 49 for interacting with the operator and connected to the ROT (Remote Operation Terminal) 50. A log-on or ACM connection request is issued from the ACM (Automated Contract/Consulting Machine) 40 to the SACD server 10. Also, the display information of waiting condition is output from the database 20 of the SACD server, along with the information reflecting a change in the waiting condition. The display unit 43 displays the present number of waiting persons, and the estimated waiting time as the display of the waiting condition received from the SACD server 10. In the case where the waiting condition is received from the SACD server 10 at every fixed interval (e.g., one minute), the newest waiting condition is displayed on the basis of the received contents.

The ACM (Automated Contract/Consulting Machine) 40 makes a request for assignment of the ROT (Remote Operation Terminal) 50, while communicating with the SACD server 10 in a certain communication form (e.g., RMI communication of Java) in a Java application operating on the operating system, for example. The client of the ACM (Automated Contract/Consulting Machine) 40 manages three states, including a state during the reception, a waiting state for assignment of the ROT (Remote Operation Terminal) 50 (during the service but no assignment for the ROT for reception is made yet), and a service start waiting state. The ACM (Automated Contract/Consulting Machine) 40 has an ROT assignment request function of issuing a request for assignment of the ROT (Remote Operation Terminal) 50, and an ROT assignment condition notifying function of notifying the estimated waiting time or the number of waiting persons. Besides, the ACM (Automated Contract/Consulting Machine) 40 has an ROT assignment interruption function of interrupting the ROT assigned state, an ACM fault recovery function of making compulsorily initialization when a fault occurs, and a direct connection request receiving function of making a request for direct connection from the ROT (Remote Operation Terminal) 50.

The ROT (Remote Operation Terminal) 50 comprises a central processing unit 51 for controlling the ROT (Remote Operation Terminal) 50, a main storage unit 52 that is a working memory of the central processing unit 51, a display unit 53 for displaying the contract transmitted from the ACM (Automated Contract/Consulting Machine) 40, an input unit 54 composed of a mouse and a keyboard for enabling the operator to make an input for the contents displayed on the display unit 53, a video conference device 55 for interacting with the customer and connected to the video conference device 49 provided in the ACM (Automated Contract/Consulting Machine) 40, and an auxiliary storage unit 56 as a memory for storing the OS. A log-on or log-off request is issued from the ROT (Remote Operation Terminal) 50 to the SACD server 10. Also, the ACM connection request assignment information is output from the SACD server to the ROT (Remote Operation Terminal) 50.

The ROT (Remote Operation Terminal) 50 deals with a request from the ACM (Automated Contract/Consulting Machine) 40, while communicating with the SACD server 10 in a certain communication form (e.g., RMI communication of Java) in a Java application operating on the operating system, for example, in the same manner as the ACM (Automated Contract/Consulting Machine) 40. The client of the ROT (Remote Operation Terminal) 50 manages three states, including a state during the reception, a reception waiting state (logged on but no assignment is made yet), and a log-off state. The ROT (Remote Operation Terminal) 50 has a log-on/log-off function of making a log-on or log-off for the SACD server 10, an assignment notification function of accepting an assignment notification of the ACM (Automated Contract/Consulting Machine) 40, a response end request function of issuing a request for ending the connection between the ACM and the ROT, an ROT fault recovery function of making recovery from the fault, a supervisor calling function of calling the supervisor while the person in charge makes the reception for the guest, and an ACM direct connection function of directly calling the ACM (Automated Contract/Consulting Machine) 40 being connected.

Referring to FIGS. 4 to 7, the display screens for management displayed on the display unit 33 for the queue monitoring terminal 30 will be described below. The same display screens may be displayed on the display unit 13 for the SACD server 10, including a case where the SACD server 10 has a function of the queue monitoring terminal 30, whereby the supervisor employing the SACD server 10 can perform a series of processes.

FIGS. 4A and 4B respectively show the display examples of a management screen for the ACM (Automated Contract/Consulting Machine) 40 and the ROT (Remote Operation Terminal) 50. FIG. 4A is a diagram showing an example of display screen for the ROT management, and FIG. 4B is a diagram showing an example of display screen for the ACM management. On the display screen for the ROT management as shown in FIG. 4A, an ROT-ID 61 that is identification data provided for each terminal of the ROTs (Remote Operation Terminals) 50, a terminal name 62, a host name 63 to which each ROT (Remote Operation Terminal) 50 belongs, the fault information 64 indicating a reason why each terminal cannot be connected, and a telephone number 65 nearest to the terminal are displayed by receiving the table information of the ROT list 21 in the database 20. The event buttons that can be designated by the supervisor are arranged at the lower part of this ROT management display screen. For example, the display screen transfers to a main page for the SACD management tool by pushing a button "Return", and transfers to an add page, a change page or a delete page for the ROT management by pushing a button "Add", "Change" or "Delete", respectively.

On the display screen for the ACM management as shown in FIG. 4B, an ACM-ID 66 that is identification data selected for each terminal, a terminal name 67 of that terminal, a branch number 68 at which that terminal is placed, a host name 69 to which the terminal is connected, and a telephone number 70 placed aside the terminal are displayed as the management information for the ACM (Automated Contract/Consulting Machine) 40. Various sorts of event buttons are arranged at the lower part of this display screen. For example, the display screen transfers to a main page for the SACD management tool by pushing a button "Return", and transfers to an add page, a change page or a delete page for the ACM management by pushing a button "Add", "Change" or "Delete", respectively.

FIGS. 5A and 5B respectively show the display examples of a person-in-charge management. FIG. 5A is a diagram showing an example of list display screen for the person-in-charge management, and FIG. 5B is a diagram showing an example of an add/change page screen for the person-in-charge management. On the display screen for the person-in-charge management as shown in FIG. 5A, a person-in-charge ID 71, a person-in-charge name 72, a division 73, and a transaction group name 74 are displayed. This person-in-charge management screen makes it possible to sort the data by the person-in-charge name 72. Also, the transaction group name 74 is acquired from the transaction group list 22 using the transaction group ID as a key by retrieving the record corresponding to the person-in-charge ID 71 from the person-in-charge skill management table 23 stored in the database 20. At this time, a plurality of transaction groups may be selected. The display screen transfers to a main page for the SACD management tool by pushing a button "Return" at the lower part of this display screen and transfers to an add page, a change page or a delete page for the person-in-charge management by pushing a button "Add", "Change" or "Delete", respectively.

On the add (change) page display screen for the person-in-charge management as shown in FIG. 5B, the person-in-charge ID 71, the person-in-charge name 72, and the division 73 can be input individually. By inputting a password 75, an addition (change) processing can be made. A plurality of transaction group names 74 can be selected by checking a selection check box. By pushing a "Cancel" button at the lower part of the screen, the display screen can be transferred to the person-in-charge management page without adding to the database 20. Also, a check for added or input items in the database 20 is made by pushing an "OK" button. If the check is OK, the display screen transfers to the person-in-charge management screen as shown in FIG. 5A.

Figure 6:
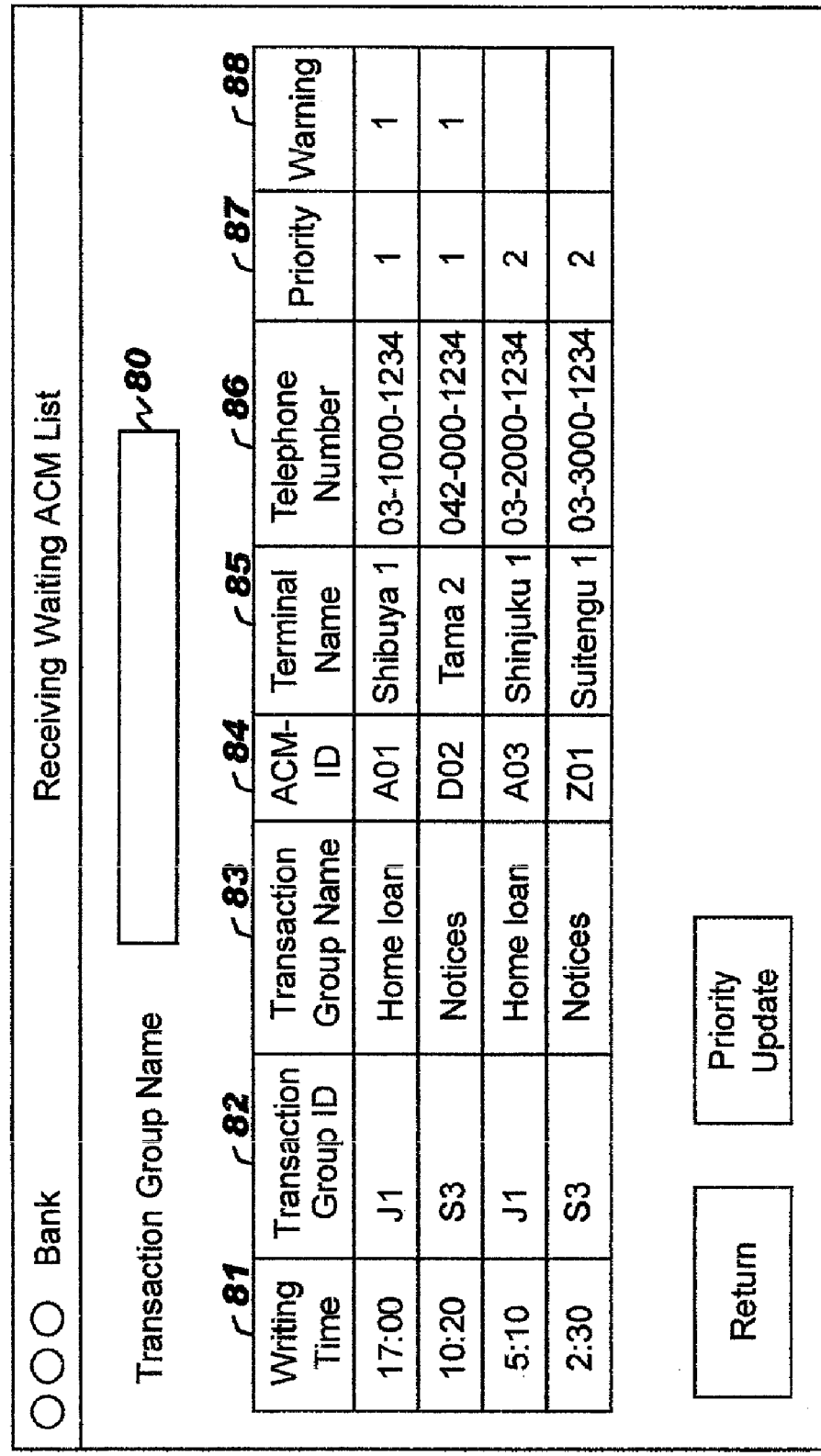
FIG. 6 is a diagram showing a display screen for a list of ACMs waiting for reception.

FIGS. 6 and 7 show the display screens for the queue that are the most characteristic configuration in this embodiment. FIG. 6 shows a display screen of a reception waiting ACM list, and FIG. 7 shows a display screen of a reception waiting person-in-charge list. These are configured to be recognized by the supervisor in which the queue monitoring terminal 30 is operated, and displayed on the display unit 33 of the queue monitoring terminal 30. The function of the queue monitoring terminal 30 may be provided in the SACD server 10, and displayed on the display unit 13 for the SACD server 10.

In the reception waiting ACM list as shown in FIG. 6, a field 80 for the transaction group name is provided, and by entering a transaction group name to be selected in this field, the queue can be displayed in a unit of transaction group. If "ALL" is input into the transaction group name to be selected, all the transaction groups can be displayed at the same time.

In this display example of the ACM list, a waiting time 81 of the guest at the ACM (Automated Contract/Consulting Machine) 40 is displayed (e.g., in minutes and seconds). Also, a transaction group ID 82 for identifying the transaction group, a transaction group name 83, an ACM-ID 84 for identifying the ACM (Automated Contract/Consulting Machine) 40, a terminal name 85, and a telephone number 86 for emergency disposed adjacent to the terminal are displayed. Also, a priority 87 of the queue and a warning 88 are displayed. Further, the display screen transfers to a main page of the SACD management tool by pushing a "Return" button, and the input priority can be reflected in the DB by pushing a "priority update" button.

For this priority 87, all the transactions may be given the same priority. However, in this embodiment, the transactions may be ordered for each transaction group that is a unit of transaction skill to create one queue in a unit of transaction skill. For example, the loan transactions include an "small loan" in which evidence and the person in question can be confirmed relatively easily and a "home loan" in which high skills are required. In this embodiment, these loans are handled by separate queues. When each transaction is accepted in the ACM (Automated Contract/Consulting Machine) 40, the processing time for every dealing is logged in the database 20, and a program for calculating the average dealing time for each transaction is executed at a predetermined timing in the central processing unit 31 of the queue monitoring terminal 30. Thereby, upon a connection request for each transaction from the ACM (Automated Contract/Consulting Machine) 40, the average waiting time is calculated on the basis of the number of persons in charge of transaction in the ROT (Remote Operation Terminal) 50 that is logged on, and the skill level and the expertness for each person in charge of transaction, whereby the "number of waiting persons" and the "estimated waiting time" can be displayed in the ACM (Automated Contract/Consulting Machine) 40.

In the case where the waiting time 81 exceeds the predicted assignment time, a number is displayed in a field of the warning 88. In this display of the warning 88, if the excess time is within n×10 minutes, "n" is displayed. The line with the warning 88 may be highlighted in yellow, for example.

Further, in the display of the reception waiting ACM list as shown in FIG. 6, the assignment waiting ACM management table 25 is read from the database 20 at every time interval, for example, every one minute, whereby the latest information is displayed. However, if the priority is input, the latest information may not be displayed till the priority update button is pushed. The waiting time 81 is sorted in the order of longer time.

Further, in this embodiment, the order of priority can be changed for each ACM (Automated Contract/Consulting Machine) 40, employing the reception waiting ACM list display as shown in FIG. 6. For example, in a case where the ACM (Automated Contract/Consulting Machine) 40 is connected to the operator in charge of another transaction due to an operation error of the guest, the priority can be changed using the "priority update" button, thereby accepting the transaction with higher priority, so that there is no need for the customer to line up again. If the waiting time is beyond a certain period, and a message of the warning 88 is displayed, the order of priority can be raised by judgement of the supervisor that operates the queue monitoring terminal 30.

On the display screen of the reception waiting person-in-charge list as shown in FIG. 7, it is displayed that a person in charge belonging to a transaction group waits for an acceptance/consulting for a time period. Firstly, a field 90 for the transaction group name is provided, and a transaction group name to be selected is input in this field, whereby the reception waiting situation can be displayed in a unit of transaction group. Also, If "ALL" is input into the transaction group name field, all the transaction groups can be displayed at the same time. In the display screen of the person-in-charge list as shown in FIG. 7, a person-in-charge ID 91 for identifying the person in charge, a person-in-charge name 92, a division 93 of whether the person in charge is an employee or a part timer, a transaction group ID 94 to which the person in charge belongs, and the transaction group name 95 are displayed. For each person in charge, a last reception date 96 is displayed. In an example as shown in FIG. 7, the persons in charge are sorted in the earlier order of the last reception date 96, whereby the person in charge can deal with the customer in the ACM (Automated Contract/Consulting Machine) 40 with almost even chance. That is, the persons in charge are allocated in the earlier order of the last reception date 96 for each skill to be handled, whereby allocation of transaction is implemented efficiently and fairly, using the queue, for the person in charge of acceptance (operator) on the center side. The display screen transfers to a main page of the SACD management tool by pushing a "Return" button at the lower part of the screen.

As described above, in this embodiment, a scheme for managing the queue information is provided for the supervisor of the queue monitoring terminal 30 placed at the center of the financial institution. This queue information is created for each transaction such as a loan or an investment trust, whereby the queue of customers employing the ACM (Automated Contract/Consulting Machine) 40 is allocated efficiently to the person in charge (operator) in the bank who operates the ROT (Remote Operation Terminal) 50.

Waiting situation information output from the queue monitoring terminal 30 is displayed via the SACD server 10 on the display unit 43 for the ACM (Automated Contract/Consulting Machine) 40. The display contents for the ACM (Automated Contract/Consulting Machine) 40 include the "estimated waiting time" and the "number of persons waiting". Since this "number of persons waiting" is allocated for each transaction in charge, an equal number of persons can be displayed for a plurality of ACMs (Automated Contract/Consulting Machines) 40 without being prejudiced in favor of a specific operator. Also, the "estimated waiting time" is not an approximate waiting time based on the empirical rules as in the past, but may be allocated by the method in this embodiment, whereby the estimated waiting time can be displayed accurately and appropriately. That is, it is possible to average variation in the waiting time caused by the transaction skills of the operator, so that the average of a dealing time including the waiting time can be shortened. By taking its result into consideration for the "estimated waiting time", the actual time of "being kept waiting" can be closer to the estimated time, so that the customer feels less sense of "being kept waiting".

A processing flow in this system (mainly the SACD server 10) will be described below using the flowcharts as shown in FIGS. 8 to 12.

Figure 8:
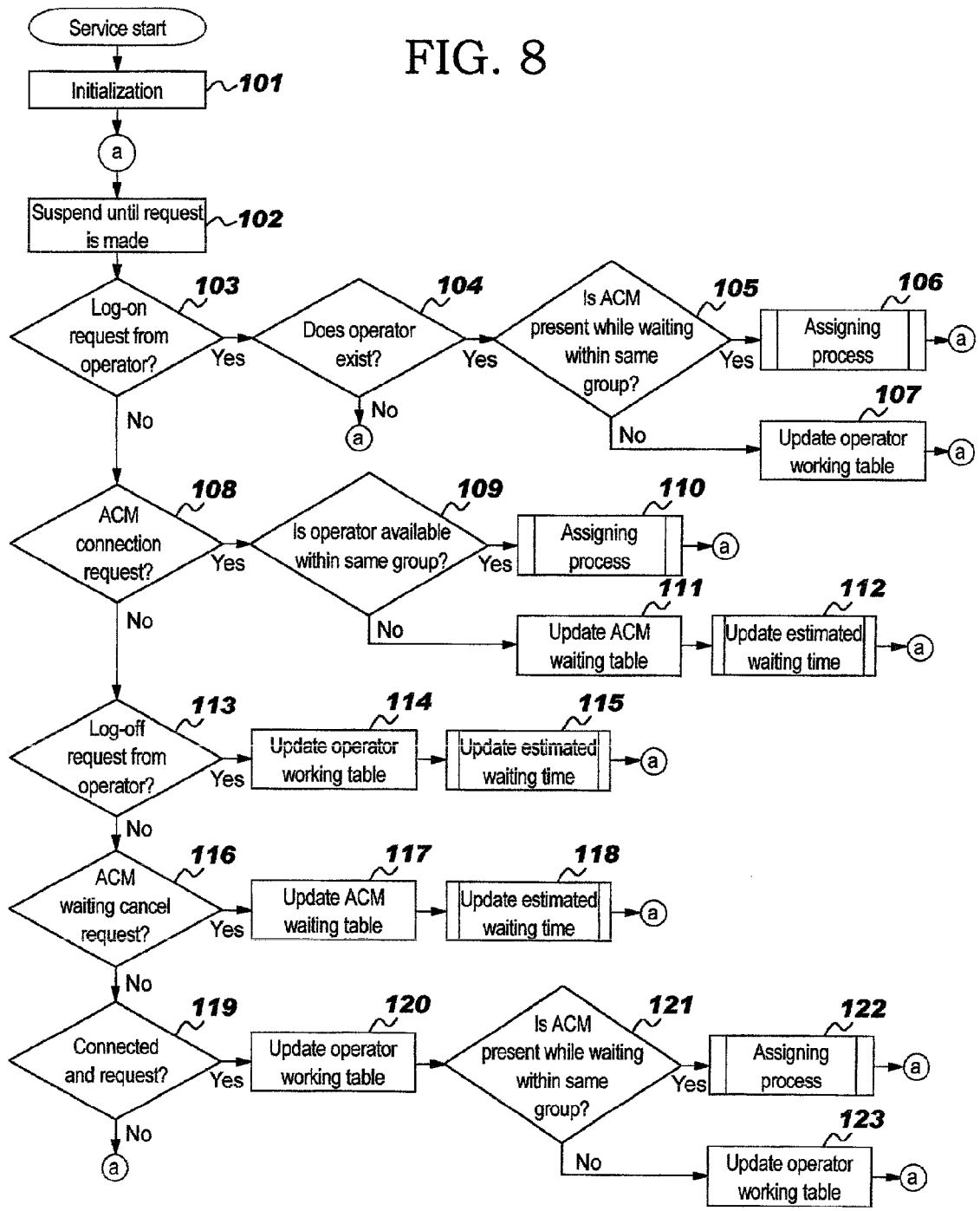
FIG. 8 is a flowchart showing a processing flow in a transaction queue calculating system.

FIG. 8 is a flowchart of a process in a queue calculating system for each transaction according to this embodiment of the invention. In this system, if the service is started, initialization is first performed (step 101). Thereafter, the procedure is suspended until there is any request from the ACM (Automated Contract/Consulting Machine) 40 or the ROT (Remote Operation Terminal) 50 (step 102). Then, a check is made to determine whether or not the request is a log-on request from the person in charge in the bank (step 103). In the case of the log-on request, it is checked whether or not a record of the person in charge who makes the log-on request exists in the table of the ROT list 21 in the database 20 (step 104). If the record does not exist in the table, the procedure returns to position "a" before step 102. If the record exists in the table, it is checked whether or not a record of the ACM (Automated Contract/Consulting Machine) 40 corresponding to the skill of the person in charge making the log-on request that is indicated on the person-in-charge skill management table 23 exists in the assignment waiting ACM management table 25 in the database 20 (step 105). If the record in the corresponding ACM (Automated Contract/Consulting Machine) 40 exists, an assigning process is performed (step 106), and then the procedure returns to the position "a" before step 102. If the record of the corresponding ACM (Automated Contract/Consulting Machine) 40 does not exist, the record for the person in charge making the log-on request is added to the working ROT management table 24 in the database 20 and the table is updated (step 107). Then the procedure returns to position "a".

If the request is not the log-on request from the person in charge at step 103, it is checked whether or not the request is a connection request from the ACM (Automated Contract/Consulting Machine) 40 (step 108). If the request is the connection request, it is checked whether or not there is any record for the person in charge corresponding to the transaction skill demanded from the ACM (Automated Contract/Consulting Machine) 40 in the working ROT management table 24 in the database 20 (step 109). If there is any record for the person in charge, the assigning process is performed (step 110), and then the procedure returns to position "a". If there is no record for the person in charge, a record of the ACM (Automated Contract/Consulting Machine) 40 having a connection request is added to the assignment waiting ACM management table 25 in the database 20 (step 111). Thereafter, an estimated waiting time update processing is performed (step 112), and then the procedure returns to position "a".

If the request is not a connection request from the ACM (Automated Contract/Consulting Machine) 40 at step 108, it is checked whether or not the request is a log-off request from the person in charge (step 113). In the case of the log-off request from the person in charge, a record for the person in charge making the log-off request is deleted from the working ROT management table 24 in the database 20 (step 114). The estimated waiting time update processing is performed (step 115), and then the procedure returns to position "a".

If the request is not the log-off request at step 113, it is checked whether or not the request is a waiting cancel request from the ACM (Automated Contract/Consulting Machine) 40 (step 116). In the case of the waiting cancel request, a record of the ACM (Automated Contract/Consulting Machine) 40 having the cancel request is deleted from the assignment waiting ACM management table 25 in the database 20, and the table is updated (step 117). Then the estimated waiting time update processing is performed (step 118), and the procedure returns to position "a".

If the request is not the waiting cancel request at step 116, it is checked whether or not the request is a connection end request (step 119). If the request is not the connection end request, the procedure returns to position "a". This means that the person in charge continues to process the queue. In the case of the connection end request, a record for the person in charge making the connection end request is deleted from the working ROT management table 24 in the database 20, and the table is updated (step 120). It is checked whether or not there is any record for the ACM (Automated Contract/Consulting Machine) 40 corresponding to the skill for the person in charge making the connection end request that is indicated by the person-in-charge skill management table 23 in the assignment waiting ACM management table 25 in the database 20 (step 121). If there is any record for the corresponding ACM (Automated Contract/Consulting Machine) 40, the assigning process is performed (step 122), and then the procedure returns to position "a". If there is no record for the corresponding ACM (Automated Contract/Consulting Machine) 40, a record of the person in charge making the connection end request is added to the working ROT management table 24 in the database 20 and the table is updated (step 123). Then the procedure returns to position "a".

Figure 9:
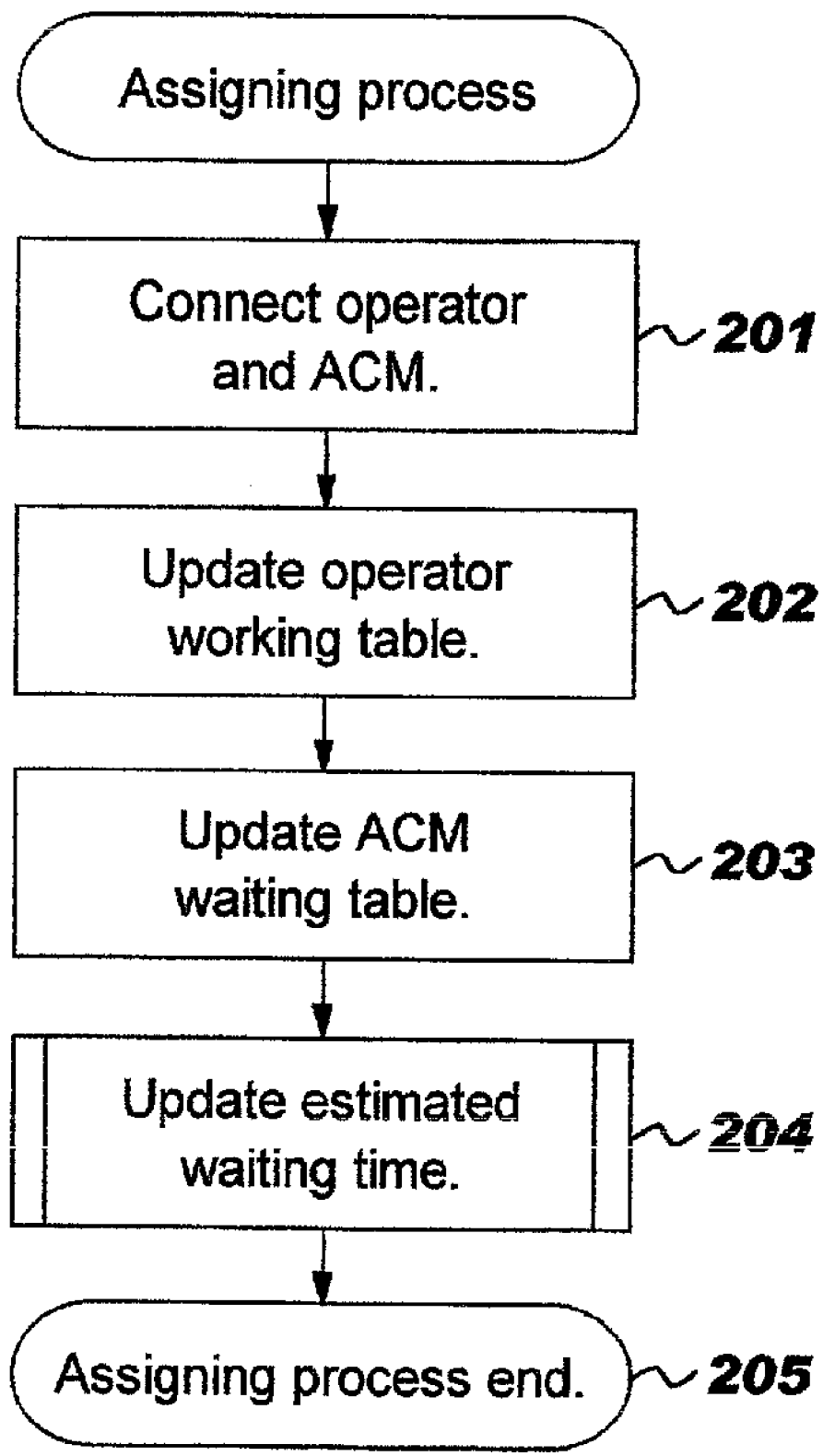
FIG. 9 is a flowchart showing an assigning process.

FIG. 9 is a flowchart showing an assigning process flow. In the assigning process, first of all, the person in charge is connected to the ACM (Automated Contract/Consulting Machine) 40 (step 201), in which step the ROT (Remote Operation Terminal) 50 and the ACM (Automated Contract/Consulting Machine) 40 are each notified of a network address of the connected partner. The record for the person in charge connected in the working ROT management table 24 in the database 20 is updated (step 202). Thereafter, the record of the ACM (Automated Contract/Consulting Machine) 40 connected is deleted from the assignment waiting ACM management table 25 in the database 20, and the assignment waiting ACM management table 25 is updated (step 203). An estimated waiting time is updated (step 204), and the assigning process is ended (step 205).

Figure 10:
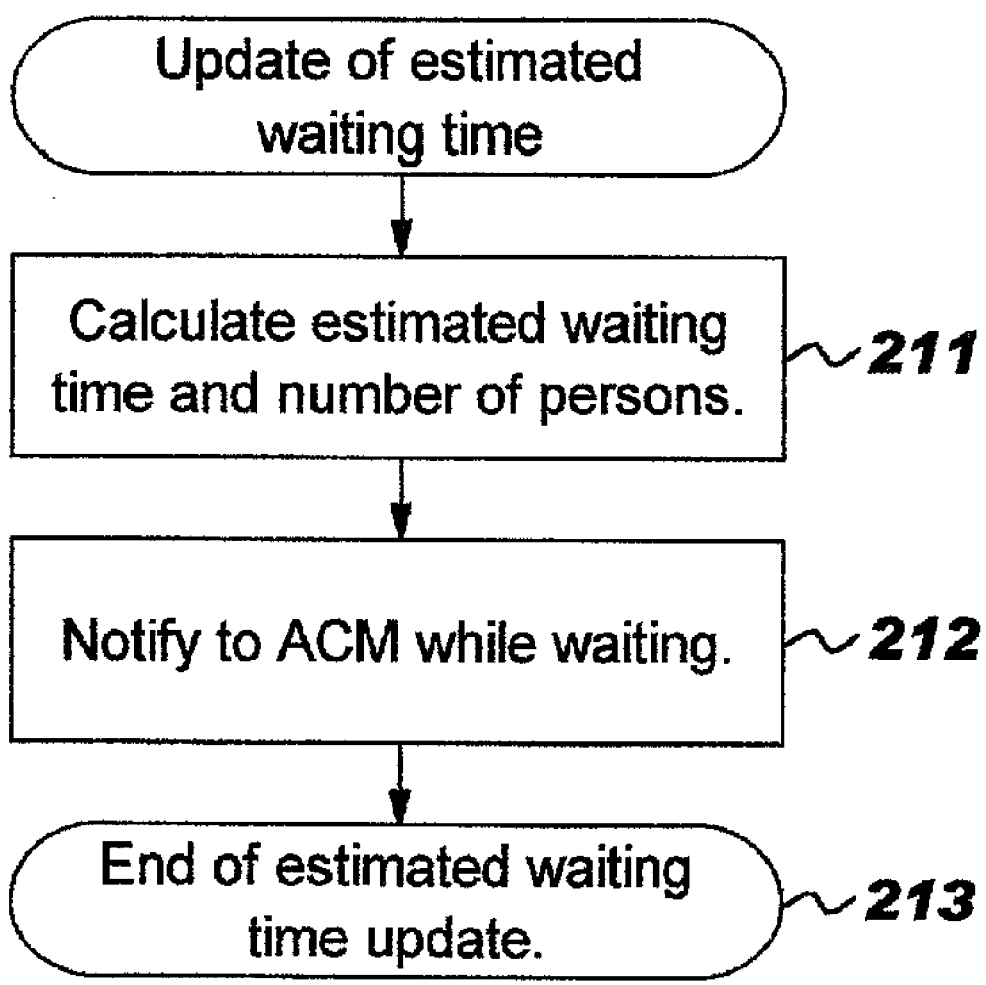
FIG. 10 is a flowchart showing a process for updating an estimated waiting time.

FIG. 10 is a flowchart showing an estimated waiting time updating process. In the estimated waiting time updating process, first of all, the estimated waiting time and the number of persons for each ACM (Automated Contract/Consulting Machine) 40 are calculated on the basis of the person-in-charge skill management table 23, the working ROT management table 24, and the assignment waiting ACM management table 25 in the database 20 (step 211). In this embodiment, the estimated waiting time and the number of persons are calculated for each transaction with a different processing time on the basis of the past data. Thereby, the waiting time can be displayed with less variation and more accuracy. Since information about transaction skills for each person in charge is provided, a more flexible assignment can be made to a customer's demand in the case where one person in charge can handle a plurality of transaction skills, so that the optimized waiting time can be expected. Thereafter, the estimated waiting time that is on the assignment waiting ACM management table 25 in the database 20 is sent to the ACM (Automated Contract/Consulting Machine) 40 (step 212), and the estimated waiting time updating process is ended (step 213).

Figure 11:
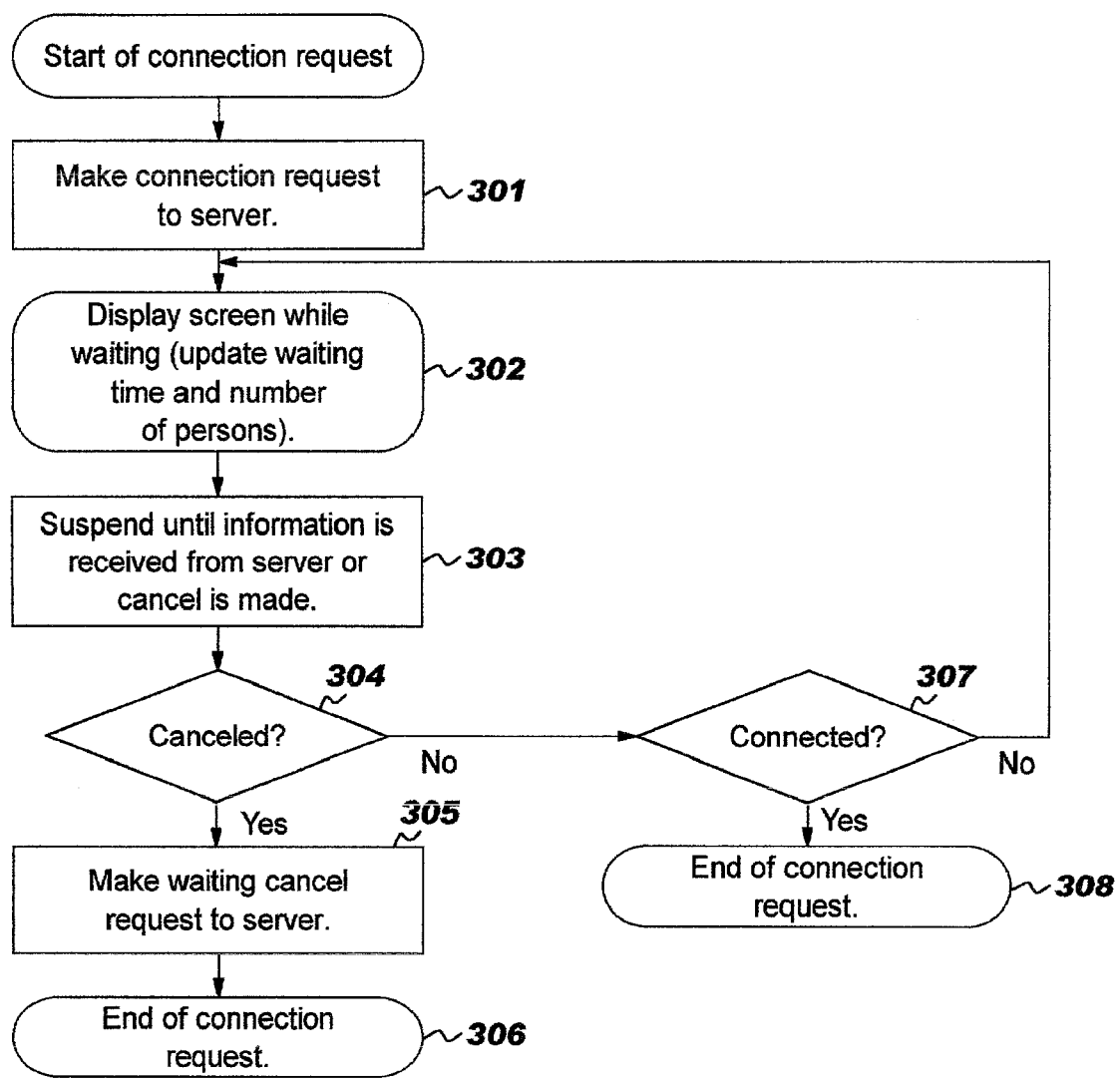
FIG. 11 is a flowchart showing a connection request process that is performed in the ACM (Automated Contract/Consulting Machine)

FIG. 11 is a flowchart showing a connection request process that is performed in the ACM (Automated Contract/Consulting Machine) 40. Upon start of the connection request, first of all, an ACM connection request is issued to the SACD server 10 (step 301). Thereafter, the waiting time and the number of waiting persons received from the SACD server 10 are displayed on the display unit 43 for the ACM (Automated Contract/Consulting Machine) 40 (step 302). Then, the procedure is suspended until the information is received from the SACD server 10 or the waiting is canceled by an input from the ACM (Automated Contract/Consulting Machine) 40 (step 303). Thereafter, it is checked whether or not the waiting is canceled by an input from the ACM (Automated Contract/Consulting Machine) 40 (step 304). When canceled, a waiting cancel request is issued to the SACD server 10 (step 305), and the connection request is ended (step 306). If not canceled at step 304, it is checked whether or not the ACM (Automated Contract/Consulting Machine) 40 is connected to the ROT (Remote Operation Terminal) 50 (step 307). If not connected, the procedure returns to step 302. If connected, the connection request is ended (step 308).

Figure 12:
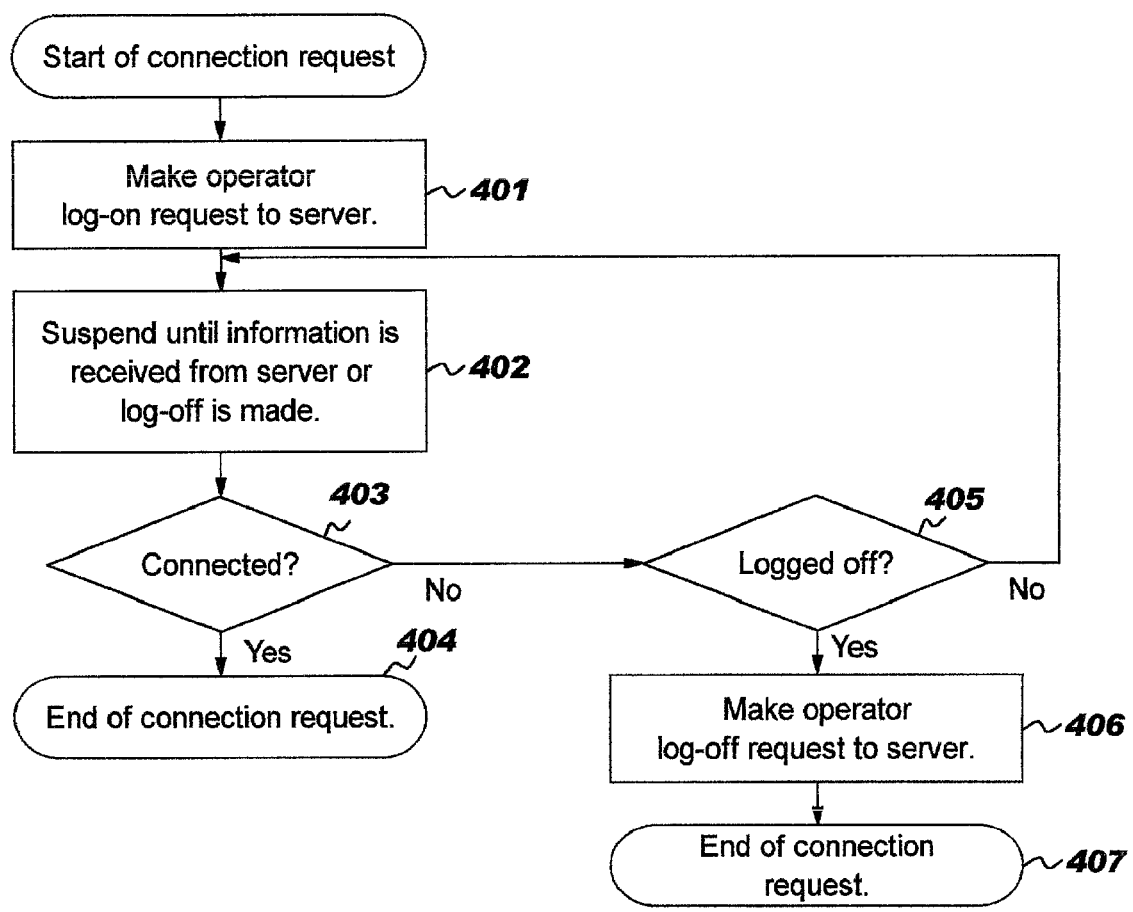
FIG. 12 is a flowchart showing a process for a connection request from a person in charge of the ROT (Remote Operation Terminal).

FIG. 12 is a flowchart showing a connection request process that is performed by the person in charge of the ROT (Remote Operation Terminal) 50. Upon start of the connection request, first of all, a person-in-charge log-on request is issued to the SACD server 10 (step 401). Then, the procedure is suspended until the information is received from the SACD server 10 or the ROT (Remote Operation Terminal) 50 is logged off by an input from the person in charge (step 402).

Thereafter, it is checked whether or not the ROT (Remote Operation Terminal) 50 is connected to the ACM (Automated Contract/Consulting Machine) 40 (step 403). If connected, the connection request is ended (step 404). If not connected, the ROT (Remote Operation Terminal) 50 is placed in an assignment waiting state, and it is checked whether or not the ROT (Remote Operation Terminal) 50 is logged off by an input from the person in charge (step 405). If not logged off, the procedure returns to step 402. If logged off, a person-in-charge log-off request is issued to the SACD sever 10 (step 406), and the connection request is ended (step 407).

In this manner, in this embodiment, each of the transactions including home loans, other loans, investment trusts, and various notices is queued for management. Generally, since the number of ROTs (Remote Operation Terminals) 50 installed at a business center is smaller than the number of ACMs (Automated Contract/Consulting Machines) 40 installed at a business office or branch, all the requests cannot be allocated at the same time. In this embodiment, however, each of the transactions is queued for management, whereby the waiting time is shortened and the efficient allocation can be made. Because conventionally such a queue was not provided, if all the ROTs (Remote Operation Terminals) 50 were in service, any request from the ACM (Automated Contract/Consulting Machine) 40 was refused. In this embodiment, however, it is possible to reduce the loss of opportunity on the financial institution side that might occur due to refusal of the request.

Since the ACM (Automated Contract/Consulting Machine) 40 contains a medium reading device 48 as an input device of a card reader, for example, the customer data can be designated in advance when in on-line connection to the host computer. Thereby, specific handling for the transaction (e.g., explanation of commodity, printing the application form, and displaying an entry example) can be practiced in advance to the customer for a waiting time until the operator is assigned. Thereby, after the operator is assigned, it is only necessary to make a check for omission in the document in accordance with a predetermined procedure, whereby the processing time after assigning the operator can be reduced.

Furthermore, in this embodiment, the excellent customers can be selected because the customer data can be designated. For the selected excellent customers, the more skilled operator is allocated, whereby it is expected that the degree of customer satisfaction can be enhanced. In a case where the transaction desired by the guest clearly contributes to more profits of the bank (e.g., loan or investment trust), the chance of profits can be increased.

As described above, with this invention, in assigning the operator who operates the operator terminal upon a reception request from the customer terminal, the waiting time of the guest can be optimized.

We claim:

1. A customer terminal for communicating with an operator terminal to process a transaction between a customer at the customer terminal and an operator at the operator terminal, the customer terminal comprising:
    a request accepting unit for accepting a reception request for a transaction of a given type from a customer;
    an outputting unit for outputting the reception request and information about said transaction to a server;
    a receiving unit for receiving, from said server, an estimated waiting time for a reception requested by the reception request and for receiving waiting conditions from the server at fixed intervals, the estimated waiting time being determined from a reception status of at least one operator having a predetermined transaction skill to handle transactions of the given type; and
    a video conference system device for interacting with said at least one operator at the operator terminal and to enable video conferencing between the customer at the customer terminal and the operator at the operator terminal;
    a display unit for displaying said estimated waiting time received by said receiving unit; and wherein
    the customer terminal manages three states, including:
    i) a waiting state, wherein the customer terminal waits for assignment to one of a group of operator terminals,
    ii) an assignment state, wherein the customer terminal has been assigned to one of the operator terminals, and
    iii) a service state, wherein the requested transaction is handled by the operating terminal to which the requested transaction is assigned;
    when the customer terminal outputs the reception request, the estimated waiting time for the transaction requested by the customer terminal, and the number of persons waiting for other transactions of the given type of transaction requested by the customer terminal are displayed on the customer terminal; and
    the customer terminal includes:
        an operator terminal assignment interruption function of interrupting the assignment state of the customer terminal; and
        a direct connection request receiving function of making a request for a direct connection from the one of the operator terminals;
    the server, in response to the reception request from the customer terminal, checks to determine whether there is any record of an operator having the predetermined transaction skill needed to handle the transaction of the given type requested at the customer terminal;
    the customer has a customer ID, and the customer is assigned to a selected one of the operators on the basis of the customer's ID, and the reception status of the at least one operator having the predetermined transaction skill, and wherein once the customer is assigned to the selected operator, the state of the customer terminal changes to the assignment state or the service state;
    upon receiving the reception request, the server calculates the estimated waiting time on the basis of the number of operators that have logged on the server, and a skill level and an expertness for each of the operators at handling transactions of the given type requested at the customer terminal;
    the customer is put in a line to wait for one of the operators, and the state of the customer terminal is changed to the waiting state;
    the receiving unit receives a priority for said transaction based on given criteria including the reception status of the operator terminal of the at least one operator having the predetermined transaction skill to handle transactions of the given type requested at the customer terminal; and
    when the customer terminal is connected to one of the operators in charge of another transaction due to an error of the customer, said priority is changed, thereby accepting the transaction with a higher priority, so there is no need for the customer to line up again, to shorten the waiting time of the customer.

2. The terminal according to claim 1, further comprising a customer identification unit for identifying the customer making the reception request, wherein said estimated waiting time is determined further based on information about the customer identified by said customer identification unit.

3. The customer terminal according to claim 1, wherein:
after said estimated waiting time and the number of waiting persons are displayed, the reception request is suspended until selected information is received from the server; thereafter, a check is made to determine if the customer terminal is connected to one of the operator terminals; and if the customer terminal is connected to one of the operator terminals, the reception request is ended.

* * * * *